Aug. 13, 1946.  D. K. ALLISON  2,405,728

OZONIZER

Filed June 26, 1941

INVENTOR
DONALD K ALLISON
BY
ATTORNEY

Patented Aug. 13, 1946

2,405,728

UNITED STATES PATENT OFFICE 2,405,728

OZONIZER

Donald K. Allison, Beverly Hills, Calif.

Application June 26, 1941, Serial No. 399,910

6 Claims. (Cl. 204—319)

1

My invention relates to ozonizers, more particularly to electrical devices for converting the oxygen contained in air to ozone for the purpose of utilizing the ozone in the treatment of liquids or the purification of water. Among the objects of my invention are:

First, to provide an ozonizer in which the power to drive the moving parts of the ozonizer is derived from an air motor driven by the incoming air whereby the air is both reduced in pressure and heat is extracted, all in addition to any preliminary cooling and drying of the air;

Second, to provide an ozonizer which, by utilizing the energy of compressed air instead of an extraneous source of power, facilitates preliminary compression, cooling and drying of the air at higher pressures than would otherwise be feasible, for all the power may be utilized to compress the air initially instead of being divided and used to drive auxiliary equipment;

Third, to provide an air motor-driven ozonizer wherein the pressure maintained therein and the supply of air thereto is regulated automatically by the rate at which the ozonized air is drawn off even though the demand should fluctuate, for as the pressure within the ozonizer increases the power required to drive the moving parts increases, thus increasing the load on the air motor so as to reduce its speed and thereby reduce the supply of air;

Fourth, to provide, on the whole, a novelly constructed ozonizer which is particularly adapted for use in my ozonizing apparatus and method described in application, Serial No. 397,070, filed June 7, 1941.

Figure 1:
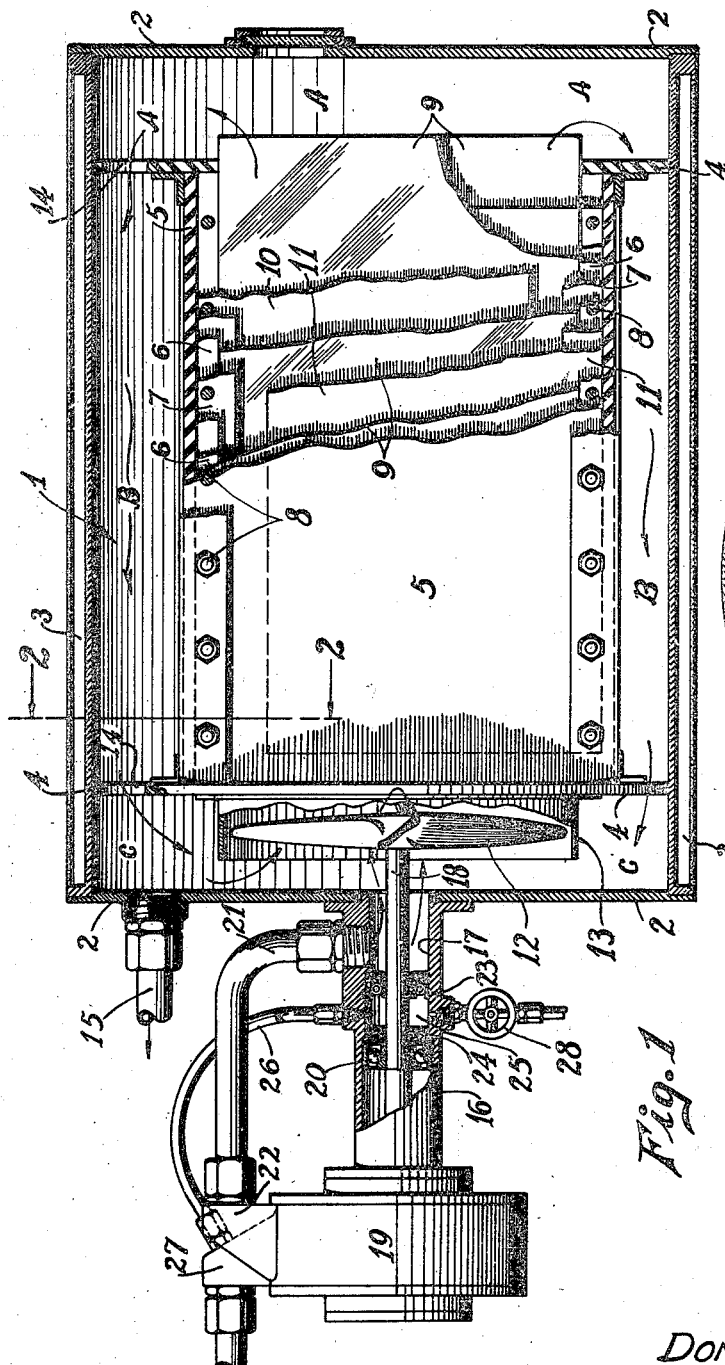
Figure 2:
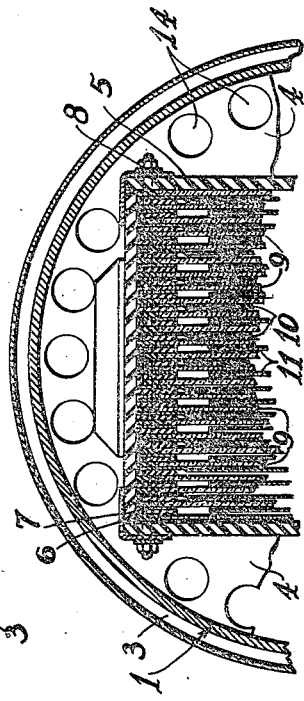

With the above and other objects in view, as may appear hereinafter, reference is made to the accompanying drawing, in which:

Figure 1 is a partial elevational, partial longitudinal sectional view of an ozonizer embodying my invention; and Figure 2 is a fragmentary transverse sectional view thereof through 2—2 of Figure 1.

With reference to the drawing, the ozonizer here illustrated comprises a housing or casing 1 which is cylindrical in form and open at its ends. End members 2 are secured to the end margins of the casing 1 to provide an enclosure. The casing 1 is preferably provided with a cooling jacket 3 through which water or other cooling fluid or liquid may be circulated.

Within the casing 1 and spaced from the end members 2 is a pair of partition plates 4 formed of insulation material. The partition plates support a rectangular shell 5, also of insulation material. The ends of the shell 5 are open and corresponding openings are provided in the partition plates.

Arranged along the top and bottom sides of the shell 5 are a series of longitudinal extending separator bars 6 and 7 which are held in place by transversely extending bolts 8. The separator bars 7 are wider than the separator bars 6 so as to form a series of channels which slidably receive dielectric plates 9. The separator bars provided at the upper side of the shell 5 clamp a series of electrostatic plates 10 which extend into alternate spaces provided between the dielectric plates 9. Similarly, the lower set of separator bars clamp a second series of electrostatic plates 11 which extend upwardly between alternate dielectric plates. One set of electrostatic plates may be grounded, while the other is well insulated from the casing 1. Sufficient voltage differential is applied to the two sets of electrostatic plates 10 and 11 to create a silent discharge or corona discharge without however causing actual arcing between the electrostatic plates. Under such conditions, the oxygen in the air surrounding the plates is transformed into ozone.

Sufficient space is provided between the electrostatic plates and the dielectric plates to permit circulation of air from one end to the other of the shell 5. Circulation is maintained by a propeller 12 located at one end of the shell 5. An annular housing 13 is provided around the propeller and circulation ports 14 are provided in the partition plates 4 between the shell 5 and the casing 1 so that air may pass longitudinally through the shell 5 into end chamber A at the far side of the shell 5 from the propeller, then backward through the chamber B between the shell 5 and casing 1, and into chamber C in which the propeller 12 is mounted. A discharge pipe 15 is provided in chamber C, through which the ozonized air is withdrawn.

An inlet tube 16 is centered with respect to the axis of the propeller and is provided with a bore 17 which receives a propeller shaft 18. The propeller shaft 18 is suitably connected to the rotor of an air motor 19. The air motor may be any suitable motor, preferably of the positive displacement type; for example, the conventional sliding vane type of air motor is quite satisfactory.

The propeller shaft is materially smaller in diameter than the bore 17 and is supported on bearings 20 spaced from the inner end of the inlet tube 16; that is, the end communicating with chamber C. At a point between the bearings 20 and the inner end of the inlet tube an air supply pipe 21 communicates with the bore 17. The air supply pipe is connected to the exhaust side 22 of the air motor. Between the point of connection of the air supply pipe 21 and the bearings there is provided a seal ring 23. A second seal ring 24 is provided adjacent the innermost bearing. Between the two seal rings is formed a high pressure chamber 25 which is connected by a high pressure line 26 to the intake or high pressure 27 of the air motor. A drain valve 28 may likewise be connected with the high pressure chamber. The exhaust air from the motor, by entering the inlet tube 16 around the propeller shaft 13, tends to maintain an atmosphere of air at this point rather than ozone. This is important for the reason that ozone attacks lubricants, so that it is highly desirable to keep the bearings which support the propeller shaft entirely free from contact with any ozone. This is further insured by the provision of the high pressure chamber 25 which isolates the bearings 20. Any nominal leakage of high pressure air from the high pressure chamber into the bearings or into the inner end of the inlet tube bore 17 of course does no harm, but ozone is entirely excluded from the bearings.

Operation of my ozonizer is as follows: Air is first compressed, dried and cooled, as disclosed more fully in my aforementioned copending application. The compressed, dried and cooled air is delivered to the air motor and is utilized to drive the propeller 12. The discharge or low pressure air enters the inlet tube 16 and through the bore 17 therethrough passes into the ozonizer chamber C and is forced by the propeller through and between the electrostatic plates. The air motor causes the compressed air to perform work as it is lowered in pressure. This has the effect of extracting a material amount of heat from the air, thereby further lowering the temperature of the air below that which exists in the high pressure lines. This is highly desirable for the reason that the efficiency of the ozonizer increases as the temperature of the air is reduced and it is necessary to maintain the air as cold as possible for the reason that heat is generated in the ozonizer during conversion of the oxygen to ozone. For example, in actual tests, air entering the air motor has been reduced from 30 pounds to 8 pounds; simultaneously, its temperature has been reduced from 70° to 57° F.

As the air flows through and between the electrostatic plates and is subjected to the corona discharge, ozone will be formed in well-known manner. Thereafter the ozonized air is forced through the circulation ports 14 into the chamber B and is caused to flow in a reverse direction and in heat exchange relation with the cooling jacket 3. During this stage of the cycle, the ozonized air is further cooled. From the chamber B, the ozonized air is forced through ports 14 into chamber C and flows toward the propeller, as shown by the arrows in said chamber, where it mixes with the incoming air issuing from the bore 17. The mixture is thereupon forced, by the propeller through the electrostatic plates where it is subjected to the corona discharge as heretofore stated. Thus the air is recirculated in a recurring cycle through the corona discharge space and in heat exchange relation with the cooling jacket, this action resulting in extremely efficient operation.

A substantial amount of power is required to drive the propeller and, of course, the propeller could be driven by an electric motor or other extraneous means. However, by utilizing the power of such extraneous motor, that is, by adding this amount of power to the prime mover for the air compressor, the air may be cooled and dried at a higher pressure than would otherwise be possible, or a greater volume of air may be treated. As much as two-thirds of the energy supplied to the compressed air by the compressor may be returned in the form of useful work through the use of the air motor. Were it not for the air motor this energy would be entirely wasted.

It should be noted that some form of circulating means is required. Any such means necessarily adds heat to the air in proportion to the work done on it. Therefore, even though the propeller should return to the air all heat extracted by the air motor, the advantage gained is still the amount of heat extracted by the air motor, for to drive the propeller by an extraneous means would require excess precooling equal to the heat extracted by the air motor.

Various changes and alternate arrangements may be made within the scope of the appended claims, in which it is my intention to claim all novelty inherent in the invention as broadly as the prior art permits.

I claim:

1. Ozonizing apparatus comprising a housing having side and end walls and having electrical ozone generating means therewithin, means defining communicating passages in the housing at opposite ends thereof and along its side walls, cooling means in heat exchange relation with said side walls, one of said end walls being provided with a substantially centrally-disposed opening, a supporting member carried by said one end wall outside of said housing and having a hollow chamber communicating with the housing, an air motor mounted on said supporting member, means to supply air under superatmospheric pressure to said motor to operate the latter, the air in passing through said motor being expanded, reduced in pressure and lowered in temperature, means to conduct the expanded and cooled air to said hollow chamber and thence to said housing, and an impeller drivably connected with said motor and positioned within the housing for forcing air delivered to said housing past said generating means and through said passages in heat exchange relation with the cooling means in a recirculating circuit.

2. Ozonizing apparatus comprising a housing having side and end walls and having electrical ozone generating means therewithin, means defining communicating passages in the housing at opposite ends thereof and along its side walls, cooling means in heat exchange relation with said side walls, one of said end walls being provided with a substantially centrally-disposed opening, a supporting member carried by said one end wall outside of said housing and having a hollow chamber communicating with the housing, an air motor mounted on said supporting member, means to supply air under superatmospheric pressure to said motor to operate the latter, the air in passing through said motor being expanded, reduced in pressure and lowered in temperature, means to conduct the expanded and cooled air to said hollow chamber and thence to said housing, a shaft connected with said motor and extending through said chamber into said housing, and an impeller carried by the end of the shaft within the housing for forcing air delivered to said housing from the chamber through said passages and past said generating means in a recurring cycle.

3. Ozonizing apparatus comprising a housing having cooling means arranged in heat exchange relation therewith, an electrical ozonizer unit within the housing including an open-ended shell having spaced ozonizing units therein including electrostatic and dielectric plates spaced apart to define unobstructed corona-producing spaces therebetween, means for mounting said shell within the housing in spaced relation with the walls thereof to define a compartment at each end of the housing and a chamber surrounding the shell and communicating with both compartments, an impeller positioned in the housing for forcibly moving air through said shell and corona-producing spaces in one direction and then through the chamber in the opposite direction in recurring cycles for successively ozonizing and cooling said air, and a single means for driving said impeller and for supplying air to said housing, comprising a rotatable air expansion motor outside of said housing, said motor having a rotatable member drivably connected with the impeller, means to supply compressed air to said motor to operate the same, and means for conducting air exhausted from said motor to said housing, the latter having an outlet for withdrawing ozonized air from the housing.

4. Ozonizing apparatus comprising a housing having electrical ozone generating means therein comprising electrostatic and dielectric plates spaced apart to define unobstructed corona-producing spaces therebetween, an impeller in the housing for circulating air therein, a single means for rotating said impeller and for supplying cooled air to said housing comprising a rotatable air expansion motor outside of said housing and having a rotatable member drivably connected with the impeller, means to supply compressed air to said motor to rotate the motor and impeller, the air exhausted from the motor being reduced in temperature and pressure by the work done in operating said motor, means for conducting the exhaust air from the motor to said housing adjacent the impeller, means for supporting the generating means within the housing in spaced relation with the walls of the housing to form with the corona-producing spaces of the generating means, a plurality of interconnected passages, all of which extend through the generating means between all of said plates and around the generating means in heat exchange relation with the housing, said impeller being positioned in one of the passages for recirculating air through all of said passages and corona-producing spaces and in intimate contact with all of said plates in recurring cycles and for mixing air subjected to the action of the generating means with fresh air from said conducting means, and cooling means arranged in heat exchange relation with the housing for cooling the ozonized air recirculated through said passages, said housing having an outlet for withdrawing ozonized air therefrom.

5. Ozonizing apparatus comprising a housing having an electrical ozone generating means therein, said means including electrostatic and dielectric plates spaced apart to define unobstructed corona-producing spaces therebetween extending from one end of the generating means to the other, all of said spaces communicating at both ends with the housing interior, means to support the generating means within the housing to form communicating chambers between the ends of the generating means and the housing and between the sides of the generating means and the side walls of the housing, cooling means in heat exchange relation with the side walls of the housing, rotatable means within the housing for forcing air past said generating means, through all of the corona-producing spaces from one end to the other and then through said chambers and in heat exchange relation with the cooling means in a recirculating circuit, and a single means for mechanically rotating said rotatable means and for supplying air to said housing for ozonization and recirculation therein comprising an air motor positioned outside of said housing, means for supplying compressed air to said motor to operate the same, and means for conducting exhaust air, cooled and reduced in pressure by the expansion thereof in said motor, to the housing, said housing having an outlet for withdrawing ozonized air therefrom.

6. Ozonizing apparatus comprising a housing having cooling means arranged in heat exchange relation therewith, an electrical ozonizer unit within the housing comprising a substantially rectangular open-ended shell supporting a plurality of electrostatic and dielectric plates therein in spaced relation with each other to form unobstructed corona-producing spaces therebetween, extending from one end of the shell to the other, a pair of spaced-apart partition plates within the housing for supporting the shell therein, in spaced relation with the walls of the housing to form a compartment at each end of the housing and a chamber surrounding the shell, said partition plates being provided with openings for connecting said compartments with said chamber, an impeller positioned in one of said compartments for forcing air through said shell and corona-producing spaces in one direction and then through the chamber in the opposite direction in recurring cycles for successively ozonizing and then cooling said air, and a single means for driving said impeller and for supplying air to said housing, comprising a rotatable air expansion motor outside of said housing, said motor having a rotatable member drivably connected with the impeller, means to supply compressed air to said motor to operate the same, and means for conducting air exhausted from the motor to the housing, the latter having an outlet for withdrawing ozonized air from the housing.

DONALD K. ALLISON.